United States Patent [19]
Matsumoto et al.

[11] Patent Number: 6,018,557
[45] Date of Patent: Jan. 25, 2000

[54] METHODS AND ASSEMBLIES FOR CLEANING A CONTROL ROD GUIDE IN A NUCLEAR REACTOR

[75] Inventors: Jack T. Matsumoto, Sunnyvale; Charles A. Dalke, Morgan Hill, both of Calif.

[73] Assignee: General Electric Company, Schenectady, N.Y.

[21] Appl. No.: 09/013,957

[22] Filed: Jan. 27, 1998

Related U.S. Application Data

[60] Provisional application No. 60/046,813, May 2, 1997.

[51] Int. Cl.[7] .................................................. G21C 19/28
[52] U.S. Cl. ............................................................ 376/316
[58] Field of Search ...................................... 376/310, 316

[56] References Cited

U.S. PATENT DOCUMENTS

| | | | |
|---|---|---|---|
| 4,534,932 | 8/1985 | Yoshikawa et al. | 376/316 |
| 5,030,410 | 7/1991 | Perry et al. | 376/310 |
| 5,217,677 | 6/1993 | Oosterkamp | 376/316 |

*Primary Examiner*—Daniel D. Wasil
*Attorney, Agent, or Firm*—Armstrong Teasdale LLP

[57] ABSTRACT

Methods and assemblies for cleaning a control rod guide tube in a nuclear reactor are described. An assembly, in accordance with one embodiment, includes a support housing and a flush tube. The support housing includes a bore extending between its first and second ends. The flush tube also includes a bore extending between its first and second ends. The flush tube extends through the support housing bore and is movably coupled to the support housing adjacent the first end of the support housing. The second end of the flush tube extends from the support housing and includes a flush nozzle which is movable between a first, or latched, position and a second, or open, position.

18 Claims, 8 Drawing Sheets

METHODS AND ASSEMBLIES FOR CLEANING A CONTROL ROD GUIDE IN A NUCLEAR REACTOR

CROSS REFERENCE TO RELATED APPLICATION

This application claims the benefit of U.S. Provisional Application No. 60/046,813, filed May 2, 1997.

FIELD OF THE INVENTION

This invention relates generally to boiling water nuclear reactors and more particularly, to cleaning control rod guide tubes by accessing the tubes from below the reactor pressure vessel rather than from above the vessel.

BACKGROUND OF THE INVENTION

A reactor pressure vessel (RPV) of a boiling water reactor (BWR) typically has a generally cylindrical shape and is closed at both ends, e.g., by a bottom head and a removable top head. A top guide typically is spaced above a core plate within the RPV. The top guide includes several openings, and fuel bundles are inserted through the openings and are horizontally supported by the core plate, and vertically supported by control rod guide tubes, control rod drive housings and stub tubes. Many other components, such as dryers, are located above the top guide.

A plurality of openings are formed in the bottom head dome so that components, such as control rod drives, can control components within the RPV. As an example, for a control rod drive assembly, a control rod drive housing is secured to the bottom head, and a control rod drive (CRD) is located within the housing. The CRD extends through the bottom head and engages a control rod blade (CRB). The CRB is located within a control rod guide tube (CRGT) positioned within the RPV. The CRD controls the position, or the elevation, of the CRB within the RPV.

During the lifetime of a reactor, debris may be required to be removed from within the CRGTs. During scram testing, for example, debris sometimes collects in the CRGTs, and such debris may enter into the CRD housings, which is undesirable.

In the past, and to remove debris from within the CRGTs, the top head must be removed and various other reactor components must also be removed to access the CRGTs. In addition, ropes and poles typically are utilized for manual delivery and manipulation of tools at the CRGTs. More specifically, and during reactor shut down, an operator typically stands on a bridge positioned over the open RPV and using ropes and poles, the operator positions tools adjacent the CRGTs to clean each CRGT. The ability to clean a CRGT and the quality of such cleaning greatly depends on the dexterity of the operator.

Cleaning a CRGT using known tools and methods can be time consuming and require removal of many reactor components. It would be desirable, of course, to avoid having to remove such reactor components to facilitate reducing the labor and time required to clean CRGTs.

SUMMARY OF THE INVENTION

These and other objects may be attained by an assembly which, in one embodiment, facilitates cleaning a control rod guide tube from a location below the reactor pressure vessel, thus eliminating the necessity of removing fuel bundles and other reactor components to access the guide tubes from the bridge. Particularly, and in accordance with one embodiment of the present invention, the assembly includes a support housing and a flush tube. A bore extends through the support housing, and the flush tube is located within the support housing bore. A bore also extends through the flush tube.

The flush tube is movably coupled to the support housing so that at least a portion of the flush tube can be extended from the support housing. A flush nozzle is secured to an end of the flush tube, and the nozzle is movable from a first, or latched, position to a second, or open, position.

Prior to operation, the CRD is removed from the CRD housing. The cleaning tool, or assembly, is then inserted into the CRD housing and the support housing is bolted to the CRD housing at the CRD flange. The flush tube, with the flush nozzle in the latched position, is then controlled to extend from the support housing and through the control rod drive housing so that the flush nozzle is located at least partially in the control rod guide tube. The flush nozzle lifts the CRB off its water seal seat, which causes the nozzle to move from its latched position to its horizontal, or cleaning, position. A flush tube valve is then opened, and reactor water and debris within the control rod guide tube enter the flush tube through the flush nozzle and exit the reactor via the flush tube bore.

To remove the tool, the flush tube is lowered so that the CRB seats on its water seal. Lowering the CRB also causes the flush nozzle to latch so that the flush tube can be fully withdrawn from within the CRGT. The assembly can then be removed from the CRD housing.

The above described assembly facilitates cleaning a control rod guide tube from a position below the bottom head and avoids having to remove fuel bundles and other reactor components within the RPV to access the CRGTs. In addition, such assembly is believed to be easy to utilize.

DETAILED DESCRIPTION

Figure 1:
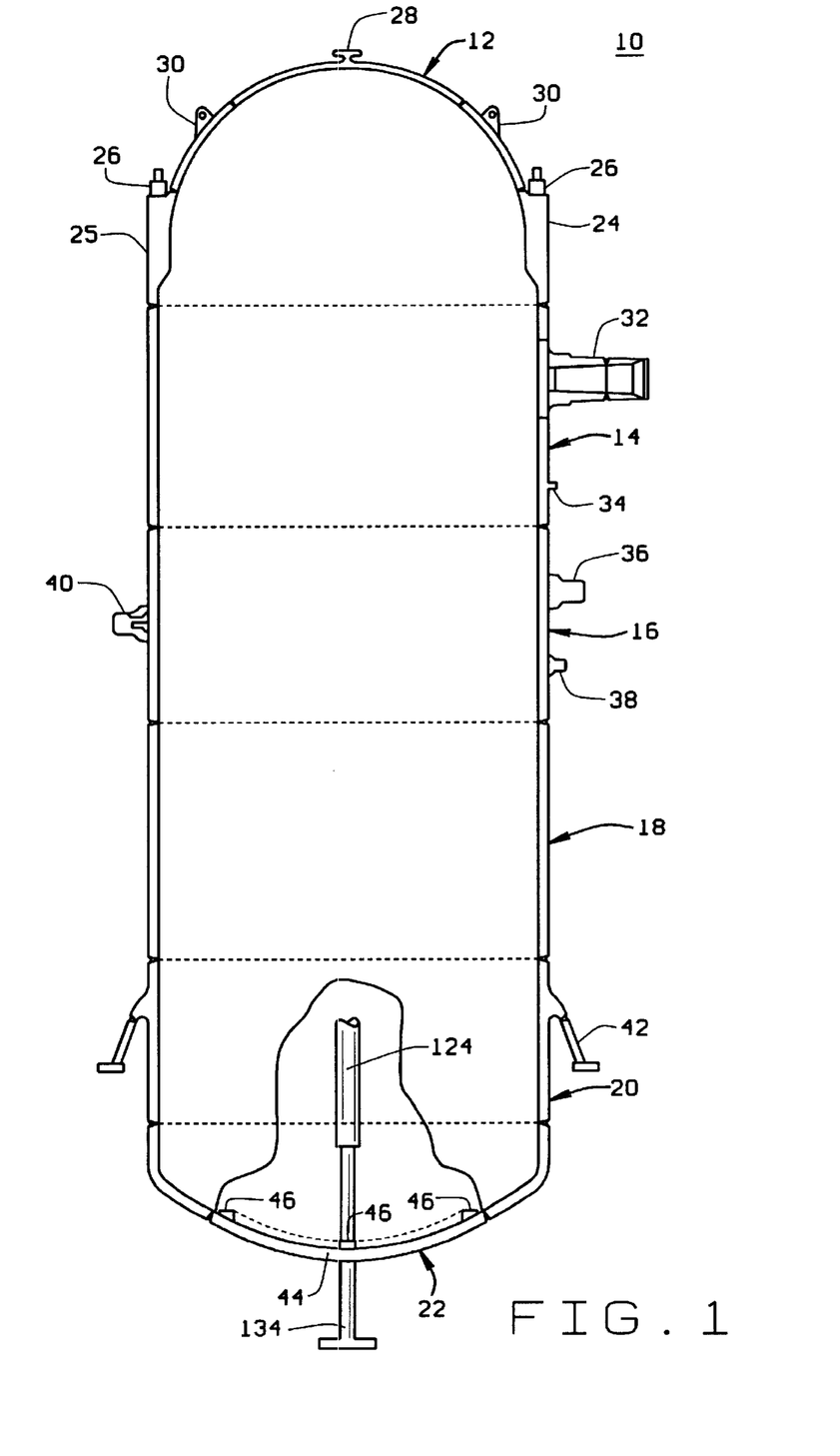
FIG. 1 is a schematic illustration of a reactor pressure vessel.

FIG. 1 is a schematic illustration of a reactor pressure vessel (RPV) 10. RPV 10 is described herein to provide an example of an RPV in which the present invention can be used. The present invention can, of course, be used in operation with many other RPV configurations, and is not limited to practice with RPV 10.

RPV 10 includes a top head 12, four substantially cylindrical shell courses 14, 16, 18 and 20, and a bottom head assembly 22. Top head 12 includes a head flange 24. First shell course 14 includes a vessel flange 25. Top head 12 is bolted to first shell course 14 by bolts 26 which extend through head flange 24. Top head 12 also includes a head spray and vent nozzle 28 and lifting flanges 30 used when lifting top head 12 from first shell course 14.

First shell course 14 includes main steam nozzles 32 through which steam flows out of the RPV 10. Stabilizer brackets 34 also are formed on first shell course 14. Second shell course 16 has a number of nozzles 36, 38 and 40 formed therein. Fourth shell course 20 includes a support skirt 42 welded thereto. Support skirt 42 is utilized to support RPV 10 within the reactor housing (not shown).

Bottom head assembly 22 includes a bottom head dome 44 having a plurality of stub tubes 46 welded thereto. Stub tubes 46 are substantially cylindrical and each stub tube 46 has a bore (not shown in FIG. 1) extending therethrough. The bore of each stub tube 46 is aligned with an opening (not shown in FIG. 1) in bottom head dome 44. Components such as control rod drive housings 134 (only one control rod drive housing 134 is shown in FIG. 1), incore instrument housings, pressure instrument nozzles, and drain nozzles extend through such bottom head dome openings and stub tube bores and penetrate into RPV 10.

In the past, and to clean control rod guide tubes 124 (only one control rod guide tube 124 is shown in FIG. 1) positioned adjacent respective control rod drive housings 134, top head 12 must be removed along with many other reactor components located within RPV 10 between top head 12 and bottom head dome 44. Removing such components is a tedious and time consuming task. In addition, manipulating tools from a location over RPV 10 to reach locations within control rod guide tube 124 is a difficult operation requiring much skill and dexterity.

Figure 2:
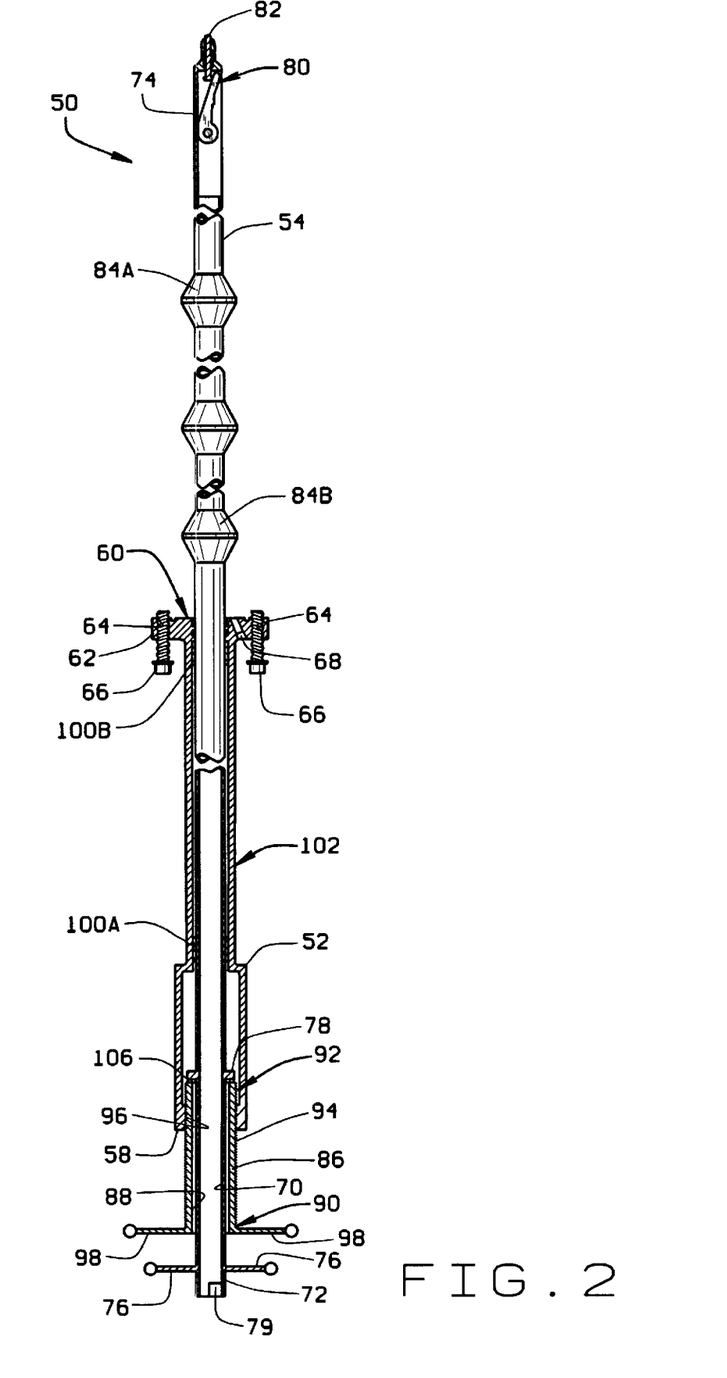
FIG. 2 is a schematic illustration of a cleaning assembly in accordance with one embodiment of the present invention.

FIG. 2 is a schematic illustration of a cleaning assembly 50 accordance with one embodiment of the present invention. Cleaning assembly 50 includes a support housing 52 and a flush tube 54. Support housing includes a bore 56 extending between its first end 58 and its second end 60. Second end 60 includes a flange 62 configured to couple to a control rod drive housing (not shown in FIG. 2). Particularly, flange 62 includes bores 64, and bolts 66 extend through bores 64 to secure support housing 52 to the control rod drive housing. Flange 62 further includes a fill and drain port 68 for transmitting water through flange 62 to within the control rod drive housing.

Flush tube 54 includes a bore 70 extending between its first end 72 and its second end 74. Flush tube handles 76 extend substantially transversely from flush tube 54 adjacent flush tube first end 72, and a flush tube flange 78 is spaced from flush tube handles 76. Flush tube first end 72 includes a flush valve 79 movable between a first, or closed, position and a second, or open, position for enabling water and debris to flow from a control rod guide tube (not shown in FIG. 2) through flush tube 54. Flush tube second end 74 includes a flush nozzle 80 movable between a first, or latched, position (shown in FIG. 2) and a second, or open, position (not shown in FIG. 2). Flush nozzle 80 is a spring loaded nozzle and is shown coupled to a movable nozzle latch pin 82.

Flush tube 54 further includes a first centering ring 84A spaced from a second centering ring 84B. First and second centering rings 84A and 84B are positioned between flush nozzle 80 and flush flange 78, and facilitate centering flush tube 54 within the control rod drive housing (not shown in FIG. 2) and flush nozzle 80 within a control rod guide tube (not shown in FIG. 2).

Flush tube 54 extends through support housing bore 56 and is movably coupled to support housing 52 by a lift nut 86. Lift nut 86 includes a bore 88 extending between its first end 90 and its second end 92. Flush tube 54 extends through lift nut bore 88 so that lift nut 86 is positioned between flush tube flange 78 and flush tube handles 76. Lift nut 86 is coupled to support housing 52 at support housing first end 58 and extends at least partially through support housing bore 56. Particularly, lift nut 86 includes a threaded outer surface 94 which engages a threaded inner surface 96 of support housing bore 56 adjacent support housing first end 58. Lift nut handles 98 extend substantially transversely from lift nut 86 adjacent first end 90 of lift nut 86.

First and second bushings 100A and 100B, respectively, are coupled to inner surface 96 of a neck portion 102 of support housing bore 56 to facilitate centering flush tube 56 within support housing bore 56. First bushing 100A is spaced from second bushing 100B, and both bushings 100A and 100B slidably and rotatably engage flush tube 54.

Figure 3:
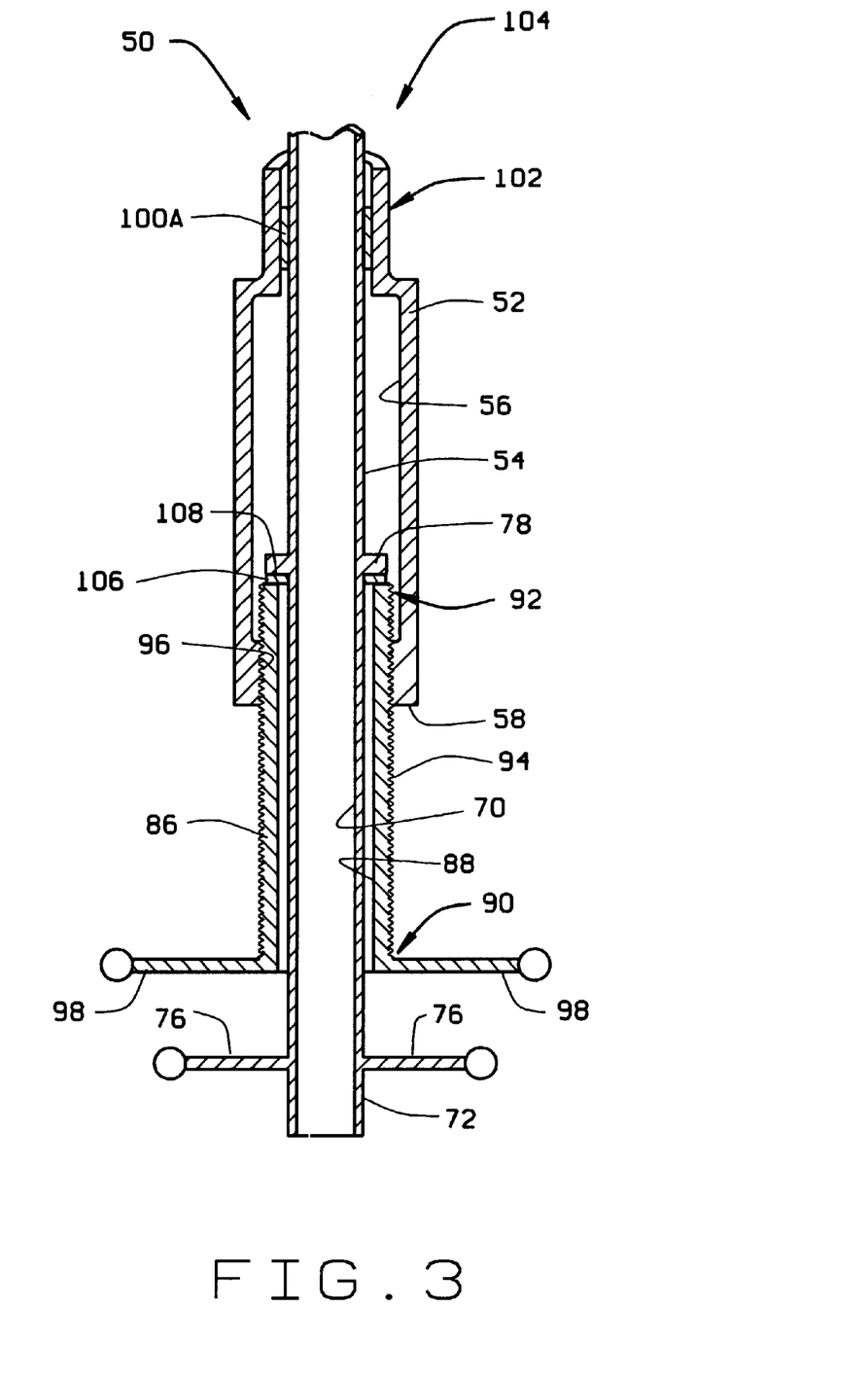
FIG. 3 is a cross-section side view illustration of a lower portion of the cleaning assembly shown in FIG. 2.

FIG. 3 is a cross-section side view illustration of a lower portion 104 of cleaning assembly 50. Flush tube 54 is both slidably and rotatably coupled to lift nut 86. Particularly, a thrust bearing 106 is positioned between a lower surface 108 of flush tube flange 78 and second end 92 of lift nut 86 to facilitate both sliding flush tube 54 coaxially with respect to lift nut 86 and rotating flush tube 54 with respect to lift nut 86. Lift nut 86 is rotatably coupled to support housing 52 via threaded outer surface 94.

Figure 4:
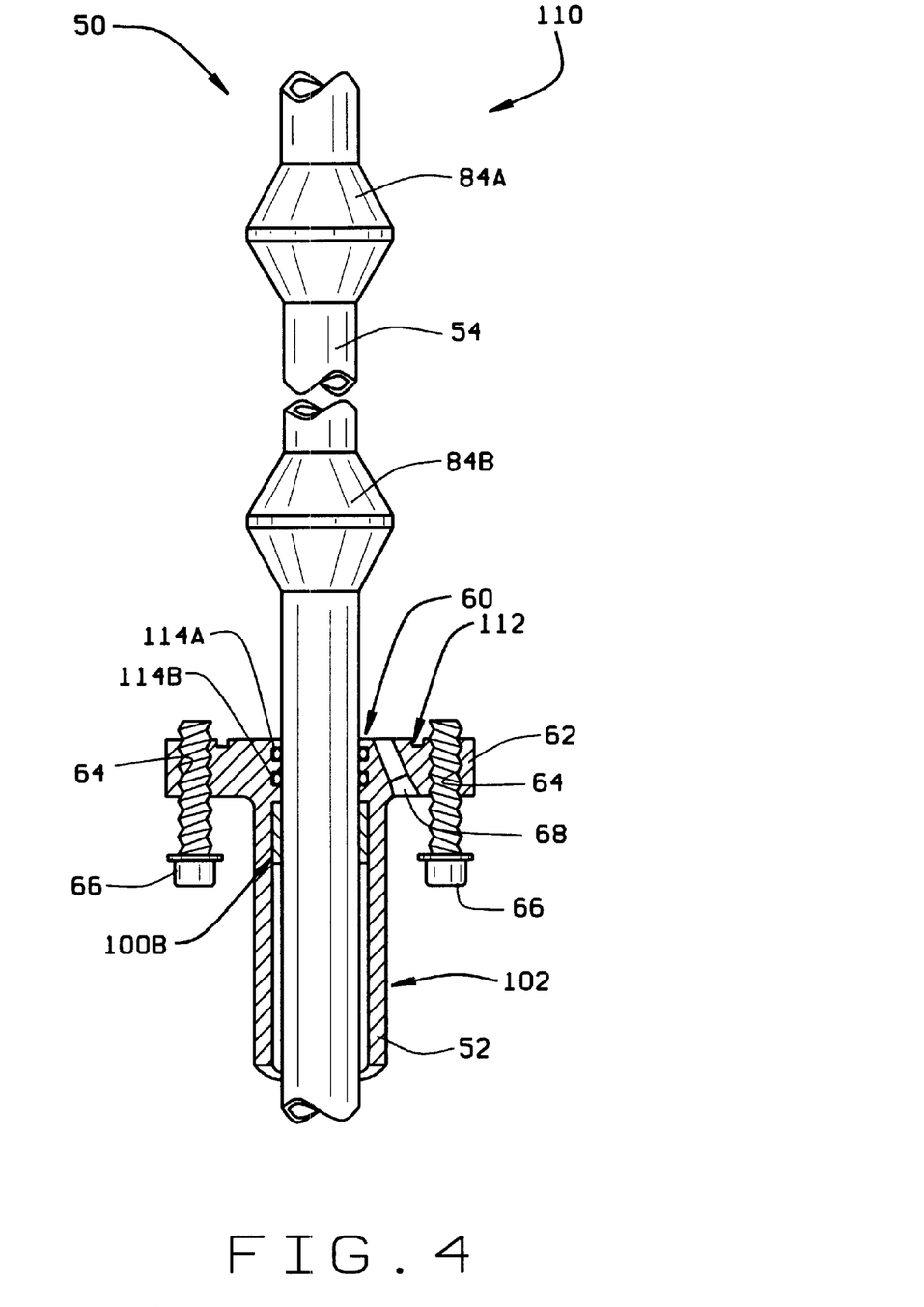
FIG. 4 is a cross-section side view illustration of a middle portion of the cleaning assembly shown in FIG. 2.

FIG. 4 is a cross-section side view illustration of a middle portion 110 of cleaning assembly 50. As shown more clearly, support housing flange 62 includes a flange seal 112 to facilitate securely coupling support housing flange 62 to the control rod drive housing (not shown in FIG. 4) with a water-tight seal. Accordingly, flange seal 112 is positioned so that fill port 68 is located between flange seal 112 and flush tube 54.

Support housing 52 includes first and second flush tube seals 114A and 114B, respectively. First flush tube seal 114A is spaced from second flush tube seal 114B, and flush tube seals 114A and 114B substantially prevent water from entering support housing 52 from a path between flush tube 54 and support housing 52.

Figure 5:
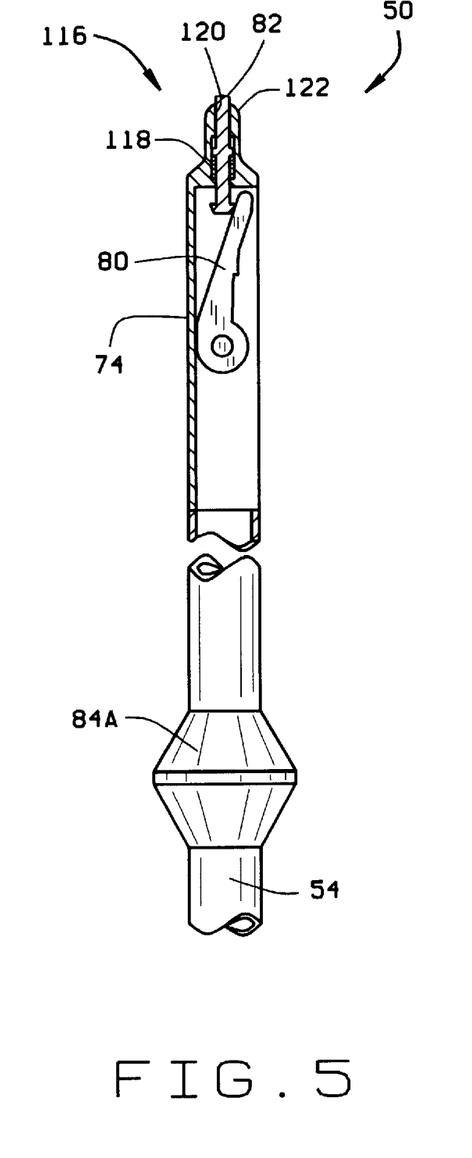
FIG. 5 is a cross-section side view illustration of an upper portion of the cleaning assembly shown in FIG. 2 with the flush nozzle in a latched position.

FIG. 5 is a cross-section side view illustration of an upper portion 116 of cleaning assembly 50 where flush nozzle 80 is in the first, or latched, position. Nozzle latch pin 82 is operationally coupled to flush nozzle 80 with a latch spring 118. In the latched position, latch pin 82 extends through an opening 120 in flush tube second end 74 and is spaced from a surface 122 of flush tube second end 74. Flush nozzle 80 also abuts latch pin 82.

Figure 6:
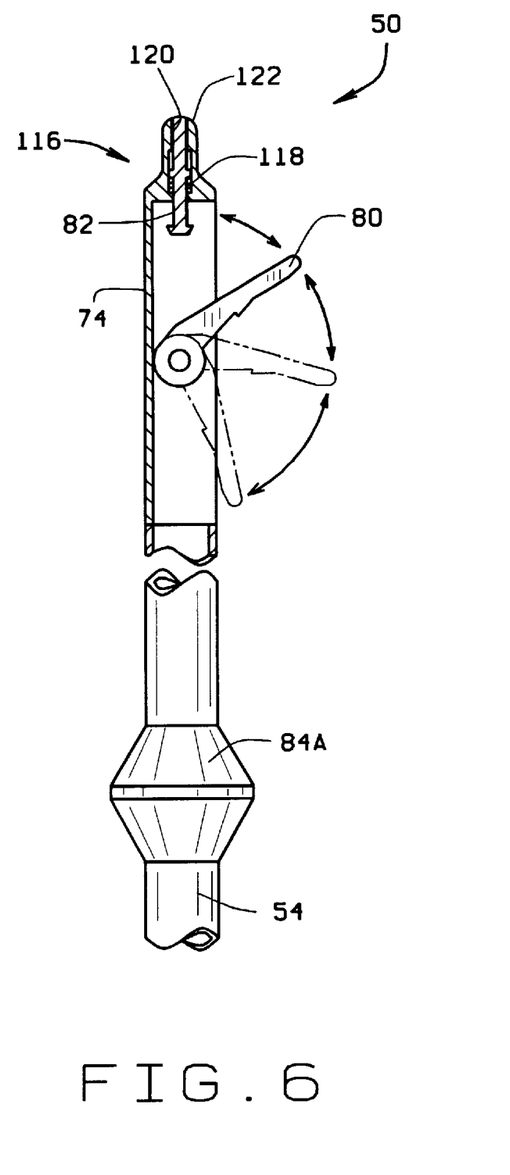
FIG. 6 is a cross-section side view illustration of the upper portion of the cleaning assembly shown in FIG. 2 with the flush nozzle in an open position.

FIG. 6 is a cross-section side view illustration of upper portion 116 of cleaning assembly 50 where flush nozzle 80 is in the second, or open, position. In the open position, latch pin 82 is substantially flush with surface 122 of flush tube second end 74, thus causing flush nozzle 80 to rotate (shown by arrows) from the first position to the second position, where flush nozzle 80 does not abut latch pin 82.

Figure 7A:
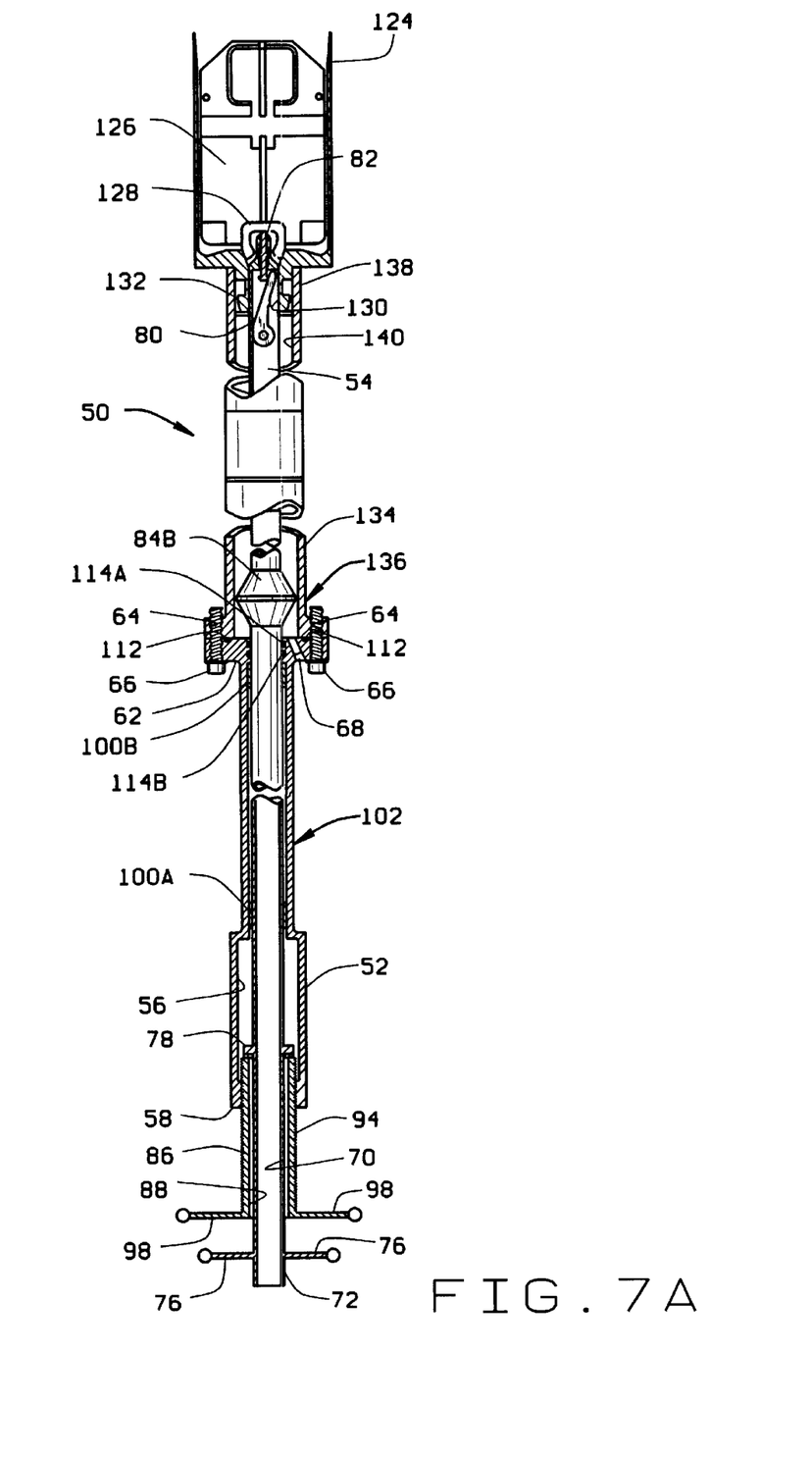
FIGS. 7a, 7b, and 7c are cross-section side view illustrations of the cleaning assembly shown in FIG. 2 positioned to clean a control rod guide tube in accordance with an embodiment of the present invention.
Figure 7B:
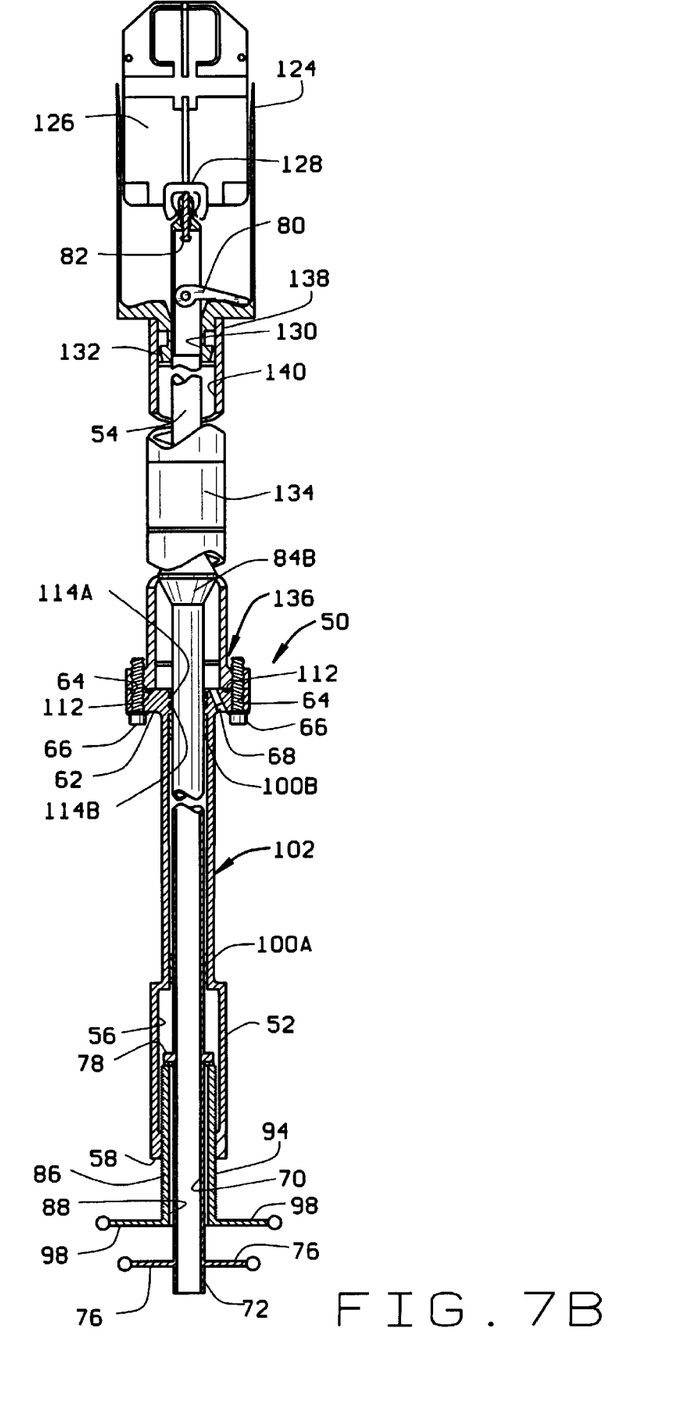
Figure 7C:
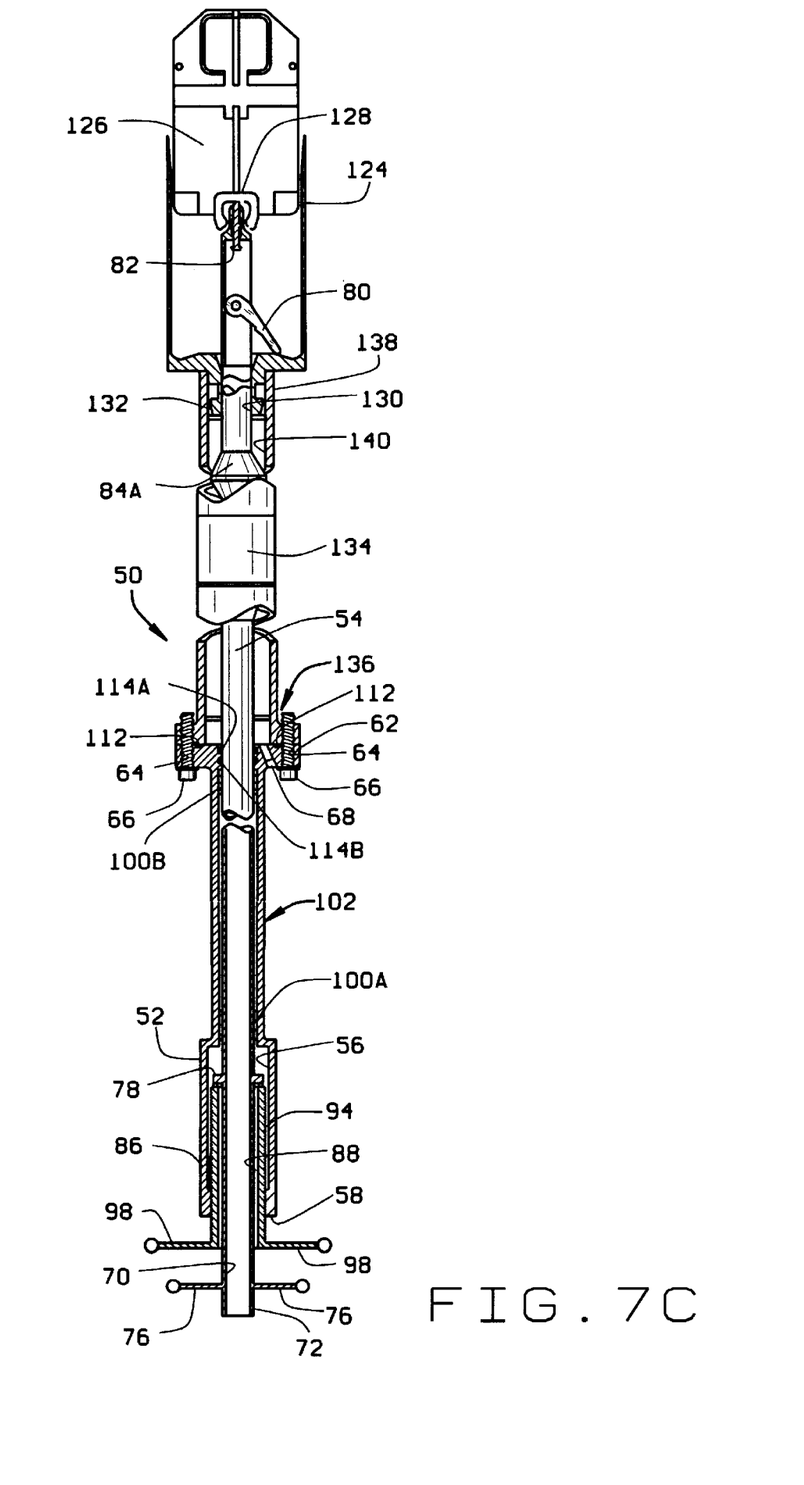

FIGS. 7a, 7b, and 7c, are cross-section side view illustrations of cleaning assembly 50 positioned to clean one control rod guide tube (CRGT) 124 in accordance with an embodiment of the present invention. A control rod blade (CRB) 126 extends through CRGT 124, and a lower end 128 of CRB 126 is substantially aligned with an opening 130 in lower end 132 of CRGT 124. CRGT 124 is coupled to control rod drive housing 134, which has a first end 136, a second end 138, and a bore 140 extending between first and second ends 136 and 138, respectively. Particularly, lower end 132 of CRGT 124 extends into control rod drive housing bore 140 adjacent second end 138 of control rod drive housing 134. CRGTs, control rods, and control rod drive housings, and the connections therebetween are well known.

In operation, a control rod drive assembly (not shown) is removed from control rod drive housing 134 in a well known manner. Upon removal of the control rod drive assembly, reactor water is prevented from draining out of the RPV, i.e., out of CRGT 124 and through control rod drive housing 134, by seals (not shown) located adjacent lower ends 132 and 128 of CRGT 124 and control rod 126, respectively. These water seals are well known. After removing the control rod drive assembly, cleaning assembly 50 is extended into CRGT 124 to clean CRGT 124.

More particularly, and referring specifically to FIG. 7a, assembly support housing 52 is coupled to control rod drive housing 134 so that support housing bore 56 is substantially aligned with control rod drive housing bore 140, and so that flush tube 54 extends through control rod drive housing bore 140. Particularly, support housing flange 62 is positioned adjacent first end 136 of control rod drive housing 134, and bolts 66 are extended through bores 64 to secure flange 62 and flange seal 112 to control rod drive housing 134. Spring loaded flush nozzle 80 is positioned in the latched position, i.e., so that flush nozzle 80 is substantially coaxial with respect to flush tube 54, and assembly 50 is positioned in a retracted position, i.e., lift nut 86 is rotated so that flush tube flange 78 is adjacent support housing first end 58.

After coupling assembly 50 to control rod drive housing 134, the flush valve (not shown) is positioned in the closed position, and water is injected into control rod drive housing 134 and flush tube 54 via fill and drain port 68 to substantially equalize hydrostatic pressure across the assembly to CRGT seal. Flange seal 112, bolts 66, and flush tube seals 114A and 114B substantially prevent water from leaking from control rod drive housing 134.

Referring now to FIG. 7b, lift nut 86 is rotated to raise flush tube 54 with respect to support housing 52. Particularly, flush tube 54 is extended through control rod drive housing bore 140 so that flush nozzle 80 extends into CRGT 124. When extending flush tube 54 into CRGT 124, latch pin 82 engages lower end 128 of CRB 126, and lower end 128 depresses latch pin 82 to actuate nozzle 80. Spring loaded flush nozzle 80 then rotates from its latched position to its open, or cleaning, position.

After flush nozzle 80 is opened, CRGT 124 is cleaned, e.g., flushed, by opening flush tube valve 79, and thus allowing reactor water, and any debris in such water, to enter flush tube 54 via opened flush nozzle 80 and exit the reactor through flush tube bore 70. Complete CRGT cleaning is achieved by rotating, raising, and lowering flush tube 54 with handles 76 and 98, respectively.

For example, and referring to FIG. 7c, lift nut 86 may be rotated with handles 98 to extend flush nozzle 80 even further into CRGT 124 than shown in FIG. 7b. In such position, flush nozzle 80 is rotated almost 180 degrees as compared to its latched position (FIG. 7a). Flush nozzle 80 may be rotated within CRGT 124 and with respect to lift nut 86 by utilizing flush tube handles 76. Similarly, flush nozzle 80 may be slidably extended even further into CRGT 124 and with respect to lift nut 86 by utilizing flush tube handles 76. In addition, lift nut 86 may be rotated using handles 98 to simultaneous rotate and extend flush tube 54 into CRGT 124 and with respect to support housing 52.

After cleaning, or flushing, CRGT 124, flush tube 54 is retracted from CRGT 124. Particularly, lift nut 86 is rotated until flush tube flange 78 is substantially adjacent support housing first end 58, and flush tube 54 is slidably retracted so that flush tube flange 78 is adjacent second end 92 of lift nut 86. While retracting flush tube 54 from CRGT 124, flush nozzle 80 engages CRGT 124 so that when flush tube 54 is fully retracted from CRGT 124, flush nozzle 80 has rotated to its latched position and the water seal between CGRT 124 and CRB 126 is re-established. Water remaining in assembly 50 and control rod drive housing 134 is then drained through fill and drain port 68, and water remaining in flush tube 54 is drained by opening flush tube valve 79. After draining the remaining water, bolts 66 are removed to disengage assembly 50 from control rod drive housing 134.

The above described assembly 50 enables cleaning a control rod guide tube from a position underneath the bottom head and eliminates the requirement that many components be removed from within the RPV to access the CRGT. In addition, such assembly is believed to be easy to utilize.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. For example, and rather than closing the flush valve after coupling the assembly to the control rod drive housing, the flush valve may be positioned in the closed position before coupling the assembly to the control rod drive housing. Accordingly, the spirit and scope of the invention are to be limited only by the terms of the appended claims.

What is claimed is:

1. A method for cleaning a control rod guide tube in a reactor pressure vessel of a nuclear reactor, the reactor pressure vessel including a bottom head dome, a control rod drive housing, and the control rod guide tube having a control rod blade at least partially positioned therein, said method comprising the steps of:

securing a cleaning assembly to the control rod drive housing; and extending at least a portion of the cleaning assembly into the control rod guide tube to clean the control rod guide tubes, wherein the cleaning assembly comprises a flush tube having a first end, a second end and a bore extending between the first end and the second end, the flush tube comprising a flush nozzle adjacent one of the first and second flush tube ends, the flush nozzle configured to move between a first position and a second position.

2. A method in accordance with claim 1 further comprising the step of injecting water into the control rod drive housing after securing the cleaning assembly to the housing.

3. A method in accordance with claim 2 wherein extending a portion of the cleaning assembly into the control rod guide tube comprises the step of lifting the control rod blade.

4. An assembly for cleaning a control rod guide tube in a reactor pressure vessel of a nuclear reactor, the reactor pressure vessel including a bottom head dome, a control rod drive housing, and the control rod guide tube, said assembly comprising:

a support housing having a first end, a second end, and a bore extending between said first end and said second end, said support housing configured to couple to the control rod drive housing; and a flush tube having a first end, a second end, and bore extending between said flush tube first end and said flush tube second end, said flush tube movably coupled to said support housing and configured to extend at least partially into said support housing bore, said flush tube comprising a flush nozzle adjacent one of said first and second flush tube ends, said flush nozzle configured to move between a first position and a second position.

5. An assembly in accordance with claim 4 further comprising a latch pin for latching said nozzle in said first position.

6. An assembly in accordance with claim 4 wherein said flush nozzle is a spring loaded nozzle.

7. An assembly in accordance with claim 4 wherein said flush tube comprises a flush tube valve adjacent one of said first and second flush tube ends.

8. An assembly in accordance with claim 4 wherein said support housing comprises a flange adjacent said support housing second end, and wherein said flange is configured to couple to the control rod drive housing.

9. An assembly in accordance with claim 8 wherein said flange comprises a fill port.

10. An assembly in accordance with claim 4 wherein said first end of said support housing is movably coupled to said flush tube.

11. An assembly in accordance with claim 4 further comprising a lift nut coupling said flush tube to said support housing.

12. An assembly for cleaning a control rod guide tube in a reactor pressure vessel of a nuclear reactor, the reactor pressure vessel including a bottom head dome, a control rod drive housing, and the control rod guide tube, said assembly comprising:

a support housing having a first end, a second end, and a bore extending between said first end and said second end, said support housing configured to couple to the control rod drive housing; and a flush tube having a first end, a second end, and bore extending between said flush tube first end and said flush tube second end, said flush tube further comprising a flush nozzle adjacent said flush tube second end; and a lift nut movably coupling said flush tube to said support housing, said lift nut configured to extend said flush tube from said support housing so that said flush nozzle extends at least partially into the control rod guide tube.

13. An assembly in accordance with claim 12 wherein said flush tube is positioned within said support housing bore.

14. An assembly in accordance with claim 12 wherein said flush tube further comprises a flush tube valve adjacent said flush tube first end.

15. An assembly in accordance with claim 12 wherein said flush nozzle is configured to move between a first position and a second position.

16. An assembly in accordance with claim 15 further comprising a latch pin for latching said nozzle in said first position.

17. An assembly in accordance with claim 12 wherein said support housing comprises a flange adjacent said support housing second end, and wherein said flange is configured to couple to the control rod drive housing.

18. An assembly in accordance with claim 17 wherein said flange comprises a fill port for transmitting water through said flange to within the control rod drive housing.

* * * * *